Patented Mar. 13, 1934

1,950,418

UNITED STATES PATENT OFFICE 1,950,418

STABLE MALT AND MALT PRODUCT

Konrad F. Schreier, Highland Park, Ill.

No Drawing. Application February 25, 1932,
Serial No. 595,221

18 Claims. (Cl. 99—10)

This invention relates to improvements in the manufacture of stable diastatic cereals and diastatic cereal products.

Malt flours have heretofore been produced, for example, as described in the Schneible Patent 1,744,581, but such products have distinct disadvantages when applied to bread making or the like, particularly as respects the formation of a sticky dough and as to flavor and color. It has heretofore been assumed that the stickiness was due to the liquefaction of the starch by the diastase of the malt flour. In the formation of a malt flour low in diastase, however, this difficulty was not prevented.

By means of this invention, not only is a flour produced which has the advantages of other processed flours in baking, but in addition, a flour is obtained which produces a non-sticky dough which may be bleached to the color of ordinary white flour, and produces bread or the like having a desirable and characteristic flavor, very closely resembling a nut bread.

In accordance with this invention, any suitable cereal grain, such as wheat, barley, rye or the like is graded to size, and then steeped in water, preferably about one-half by weight of the grain. The water may be maintained at any desirable tempering or steeping temperature, preferably from 60–70° F., and the steeping then continued until the berries are thoroughly impregnated with water. If sourness develops during the steeping or tempering, the steeped water should be drained off and an equivalent amount of fresh water added.

The grain is then processed according to any desired malting process, preferably by the drum system. The cereal grain is permitted to commence germination in the drum, but its temperature and moisture are closely controlled during the process. The temperature should be maintained at 75–82° F. The germination of the berries tends to cause a rise in temperature, and a loss of moisture. This tendency may be overcome in any desired manner, for example, by means of a current of humidified air, either sucked or forced about the germinating grain. In the drum system, the air should have an initial temperature of 56–70° F., in order to maintain the desired temperature in the mass.

The process of germination is continued in general until an amount of diastase has been formed sufficient to produce a flour testing at least 15° Lintner, and preferably 15–40°, but short of the substantial development of the proteolytic enzymes. In wheat and rye the germination should be halted at a stage between the point where the plumule first emerges through the outer husk and the point where it has developed to approximately its maximum size, and there are indications of the emergence of the primary rootlet, but in general before such emergence. In barley the stage is reached when the acrospire has emerged and has reached a development where an emergence of the rootlets is indicated, but in general before such emergence. In wheat, the coleorhiza at the most desirable point is the size of a large pinhead. In practice it is of course impossible to procure absolutely uniform germination of all berries, and the process is preferably carried out so that as large a proportion of the berries as practicable is within the limits stated. Depending upon the temperature employed, this point is reached approximately in 12—22 hours. At this stage the grain has insufficient diastase to convert its own starch, and its proteolytic enzymes are substantially undeveloped.

When the grain has reached this stage, it is immediately removed to a drying kiln where the entire mass is dried at a temperature not in excess of 130° F. and preferably from 120–130° F. After the grain has dried to about 15% moisture, precautions should be increased to keep the temperature below 130° F. in order to preserve the gummy gluten texture of the grain. After the grain has dried to less than 7% moisture, it is permitted to cool. The processed grain need not be seasoned, as is necessary with highly processed malts, but may be ground into flour or meal at once. Moreover, there is no need to remove the sprouts in order to eliminate a bitter taste in the flour, the slight development of the acrospire later shrinking, and not affecting the taste, nor is there any need to eliminate part of the gluten streams, and as a result a very materially increased yield of flour is obtained.

The flour produced by this process, unlike previous malt flour, may be bleached by the standard bleaching agents, such as novadel. Novadel is a composition of benzoyl peroxide and acid calcium phosphate. This is apparently due to the fact that in the ordinary malting of grain the carotin, or coloring matter of the grain, is so altered as to make bleaching impossible.

The flour produced likewise has an undecomposed and undisrupted gluten, and is rated as a live, as distinguished from a depleted flour. Former malt flours have always been classified as depleted.

The flavor of the diastatic flour produced by this process is not like that of former flours but has an odor and flavor resembling that of nuts. The flour produced, apparently due to the unimpaired character of the grain, and particularly of the gluten, will absorb a maximum amount of water. Apparently due to the substantial undevelopment of the proteolytic enzymes, the diastatic flour does not cause liquefaction or stickiness of the dough, there being not enough proteolytic enzymes to destroy the proteins therein. The flour, in general, has insufficient diastase to convert its own starch. Flour made from diastatic cereals prepared by this process can be used up to 30% without causing sticky dough, but 5-10% is preferred and will yield a loaf as light or lighter than ordinary white flour from the same grain. Such admixture may be made at the time of baking, or the mixed flour may be prepared in advance. A 5% admixture of the diastatic flour with a weak flour will produce a flour having the characteristics of a strong flour.

Instead of mixing the prepared flours, from 1-30% of processed cereal prepared according to this process may be incorporated with the unmilled grain and the malt and grain ground together.

The diastatic cereal may likewise be shredded or crushed into breakfast foods or the like, or used for such purpose without shredding or crushing, the grains retaining their firmness. Such products have a pleasant nut-like flavor.

The diastatic flour prepared as described, may advantageously be incorporated with milk powder, in order to produce a malted milk powder, and yields a powder having unusual flavor, which at the same time may be made white by bleaching the flour.

The foregoing detailed description has been given for clearness of understanding only, and no unnecessary limitations should be understood therefrom, but the appended claims should be construed as broadly as permissible, in view of the prior art.

I claim:

1. The method of processing grain which comprises impregnating said grain with water, permitting said grain to germinate at a germinating temperature until the coleorhiza in wheat and rye, or acrospire in barley has reached a development where emergence of the primary rootlet is indicated, and then drying said grain at a temperature not in excess of 130°.

2. The method of processing grain which comprises germinating said grain to a point where the grain has a diastase content of 15-40° Lintner and where there has been substantially no development of the proteolytic enzymes of said grain.

3. The method of processing grain which comprises germinating said grain to a point where the grain has a diastase content of not less than 15° Lintner and where there has been substantially no development of the proteolytic enzymes of said grain.

4. The method of producing diastatic flour from grain which comprises germinating said grain to a point where the grain has a diastase content of 15-40° Lintner and where there has been substantially no development of the proteolytic enzymes of said grain.

5. The method of producing diastatic flour from grain which comprises germinating said grain to a point where the grain has a diastase content of not less than 15° Lintner and where there has been substantially no development of the proteolytic enzymes of said grain, and grinding said grain.

6. The method of producing diastatic flour from grain which comprises germinating said grain to a point where the grain has a diastase content of 15-40° Lintner and where there has been substantially no development of the proteolytic enzymes of said grain, drying said grain at a temperature not in excess of 130° F. and grinding said grain.

7. The method of producing diastatic flour from grain which comprises germinating said grain to a point where the grain has a diastase content of not less than 15° Lintner and where there has been substantially no development of the proteolytic enzymes of said grain, drying said grain at a temperature not in excess of 130° F. and grinding said product to produce a palatable whole grain malt flour.

8. The method of producing a bleached diastatic flour from grain which comprises germinating said grain to a point where the grain has a diastase content of not less than 15° Lintner and where there has been substantially no development of the proteolytic enzymes of said grain, drying said grain at a temperature not in excess of 130° F. and grinding said grain and bleaching said flour with a bleaching agent.

9. Flour containing 1-30% of processed diastatic grain having a diastase content of not less than 15° Lintner, and substantially undeveloped proteolytic enzymes.

10. In making a flour, the step which comprises blending a commercial flour with 1-30% of diastatic flour having a diastase content of not less than 15° Lintner and substantially undeveloped proteolytic enzymes.

11. A cereal product containing at least 15° Lintner of diastase, and in which the proteolytic enzymes are substantially undeveloped.

12. A cereal product containing at least 15 to 40° Lintner of diastase, and in which the proteolytic enzymes are substantially undeveloped.

13. A processed grain having at least 15° Lintner of diastase and in which the proteolytic enzymes are substantially undeveloped.

14. A processed wheat having at least 15° Lintner of diastase and in which the proteolytic enzymes are substantially undeveloped.

15. A processed barley having at least 15° Lintner of diastase and in which the proteolytic enzymes are substantially undeveloped.

16. Diastatic flour having at least 15° Lintner of diastase and in which the proteolytic enzymes are substantially undeveloped.

17. A cereal product comprising a processed cereal having at least 15° Lintner of diastase and in which the proteolytic enzymes are substantially undeveloped.

18. A diastatic cereal product in flour form having not less than 15° Lintner diastase and substantially undeveloped proteolytic enzymes, and containing all of the grain except the bran.

KONRAD F. SCHREIER.